(12) United States Patent
Ishida et al.

(10) Patent No.: US 10,744,710 B2
(45) Date of Patent: Aug. 18, 2020

(54) THREE-DIMENSIONAL MODELING APPARATUS, THREE-DIMENSIONAL MODELING METHOD, AND COMPUTER PROGRAM

(71) Applicant: Seiko Epson Corporation, Tokyo (JP)

(72) Inventors: Masaya Ishida, Hara-mura (JP); Eiji Okamoto, Matsumoto (JP); Akihiko Tsunoya, Okaya (JP)

(73) Assignee: Seiko Epson Corporation (JP)

( * ) Notice: Subject to any disclaimer, the term of this patent is extended or adjusted under 35 U.S.C. 154(b) by 309 days.

(21) Appl. No.: 15/697,730

(22) Filed: Sep. 7, 2017

(65) Prior Publication Data

US 2018/0071959 A1    Mar. 15, 2018

(30) Foreign Application Priority Data

Sep. 15, 2016   (JP) ................................. 2016-180637

(51) Int. Cl.
*B29C 64/112*    (2017.01)
*B33Y 50/00*     (2015.01)
(Continued)

(52) U.S. Cl.
CPC ............ *B29C 64/112* (2017.08); *B28B 1/001* (2013.01); *B29C 41/12* (2013.01); *B29C 41/36* (2013.01);
(Continued)

(58) Field of Classification Search
CPC ..... B29C 64/112; B29C 64/386; B29C 41/36; B29C 41/12; B29C 64/106; B29C 64/40;
(Continued)

(56) References Cited

U.S. PATENT DOCUMENTS 10,118,346 B2 * 11/2018 Miedema .............. B29C 64/112
2005/0110853 A1    5/2005 Gardner et al.
(Continued)

FOREIGN PATENT DOCUMENTS

JP    2015-081380 A    4/2015
JP    2015-212042 A    11/2015
(Continued)

OTHER PUBLICATIONS

Extended European Search Report for Application No. EP 17 18 9092 dated Feb. 1, 2018 (10 pages).

*Primary Examiner* — Jeffrey M Wollschlager
(74) *Attorney, Agent, or Firm* — Harness, Dickey & Pierce, P.L.C.

(57) ABSTRACT

A three-dimensional modeling apparatus includes a modeling portion that models a three-dimensional object by laminating material layers formed by a material having a fluid property, and executes a first modeling process that forms concave portions, which are adjacent to two or more convex portions and are recessed in comparison with the convex portions in a lamination direction in which material layers are laminated, as a result of forming a plurality of convex portions that project in the lamination direction, a second modeling process that laminates a material layer on the convex portions, and forms a material layer, which is spatially separated from the material layer laminated on the convex portions, inside the concave portions, and a third modeling process that fills the concave portions with a material layer by disposing the material on the material layer inside the concave portions.

4 Claims, 10 Drawing Sheets

(51) Int. Cl.
*B29C 64/386* (2017.01)
*B33Y 10/00* (2015.01)
*B28B 1/00* (2006.01)
*G06F 30/00* (2020.01)
*B29C 64/40* (2017.01)
*B29C 64/106* (2017.01)
*B29C 41/12* (2006.01)
*B29C 41/36* (2006.01)
*G05B 19/4099* (2006.01)
*G06F 119/18* (2020.01)
*B33Y 50/02* (2015.01)
*B32B 7/02* (2019.01)
*H05K 1/02* (2006.01)

(52) U.S. Cl.
CPC .......... *B29C 64/106* (2017.08); *B29C 64/386* (2017.08); *B29C 64/40* (2017.08); *B33Y 10/00* (2014.12); *B33Y 50/00* (2014.12); *G06F 30/00* (2020.01); B32B 7/02 (2013.01); B33Y 50/02 (2014.12); G05B 19/4099 (2013.01); G05B 2219/49007 (2013.01); G05B 2219/49023 (2013.01); G06F 2119/18 (2020.01); H05K 1/0269 (2013.01); H05K 2203/063 (2013.01); Y02P 90/265 (2015.11)

(58) Field of Classification Search
CPC .... B28B 1/001; Y02P 90/265; G06F 2217/12; G06F 17/50; G05B 19/4099; G05B 2219/49007; G05B 2219/49023; H05K 2203/063; H05K 1/0269; B32B 7/02; B33Y 50/02; B33Y 30/00; B33Y 10/00; B33Y 50/00; B22F 2003/1056; B22F 3/1055

See application file for complete search history.

(56) References Cited

U.S. PATENT DOCUMENTS

| | | | |
|---|---|---|---|
| 2008/0105818 A1 | 5/2008 | Cohen | |
| 2012/0133080 A1 | 5/2012 | Moussa et al. | |
| 2015/0183162 A1* | 7/2015 | Kuk | B33Y 30/00 |
| | | | 264/129 |
| 2016/0023403 A1* | 1/2016 | Ramos | B33Y 10/00 |
| | | | 264/40.1 |
| 2016/0129632 A1* | 5/2016 | Yamazaki | B29C 64/386 |
| | | | 425/132 |
| 2016/0229124 A1* | 8/2016 | Yoshikawa | B29C 64/386 |
| 2016/0263839 A1* | 9/2016 | Miedema | B29C 64/40 |
| 2017/0106589 A1* | 4/2017 | Ishida | B22F 3/008 |
| 2017/0197360 A1* | 7/2017 | Batchelder | B29C 31/047 |

FOREIGN PATENT DOCUMENTS

| | | |
|---|---|---|
| JP | 2016-068297 A | 5/2016 |
| WO | WO-2016-139059 A1 | 9/2016 |

\* cited by examiner

FIG. 6
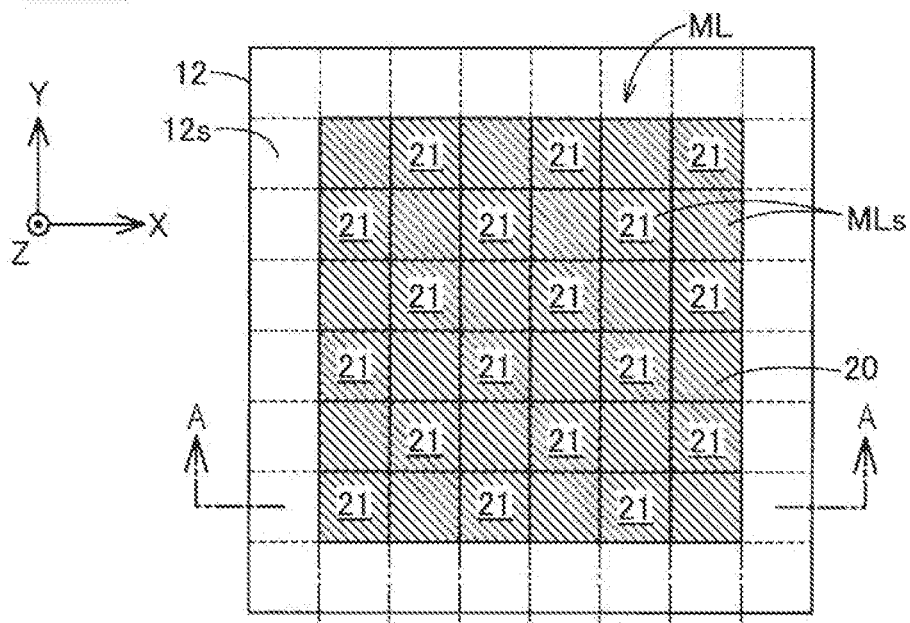
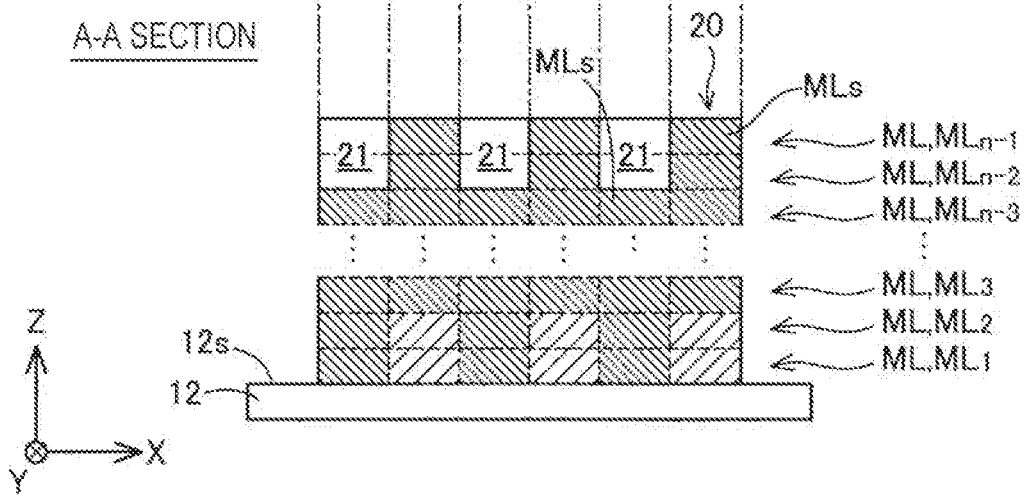

THREE-DIMENSIONAL MODELING APPARATUS, THREE-DIMENSIONAL MODELING METHOD, AND COMPUTER PROGRAM

BACKGROUND

1. Technical Field

The present invention relates to a three-dimensional modeling apparatus, a three-dimensional modeling method, and a computer program for three-dimensional modeling.

2. Related Art

Among three-dimensional modeling apparatuses, there are apparatuses that adopt a method for modeling a three-dimensional object, which is a modeling target, by sequentially stacking a material layer, which represents a cross-section of the three-dimensional object in a height direction (for example, JP-A-2015-212042 below). Such a modeling technique is also referred to as additive manufacturing.

In such a three-dimensional modeling apparatus, when a material layer, which configures a three-dimensional object, is formed, there are cases in which the dimensional accuracy (modeling accuracy) of the three-dimensional object is reduced as a result of the material having a fluid property.

SUMMARY

An advantage of some aspects of the invention is to provide a technique capable of improving reductions in the modeling accuracy of a three-dimensional object caused by flowing of the material by using a different method to the related art.

The invention can be realized in the following forms.

[1] According to a first aspect of the invention, there is provided a three-dimensional modeling apparatus. The three-dimensional modeling apparatus has a modeling portion and a control portion. The modeling portion models a three-dimensional object by laminating material layers formed by a material having a fluid property. The control portion controls the modeling portion. The control portion executes a first modeling process that forms concave portions, which are recessed in comparison with convex portions in a lamination direction in which material layers are laminated, as a result of forming a plurality of convex portions that project in the lamination direction. The control portion executes a second modeling process that laminates a material layer on the convex portions, and forms a material layer, which is spatially separated from the material layer laminated on the convex portions, inside the concave portions. The control portion executes a third modeling process that fills the concave portions with a material layer by disposing the material on the material layer inside the concave portions.

According to the three-dimensional modeling apparatus of the aspect, flowing of the material disposed in the concave portions is suppressed and flowing of the material disposed at top portions of the convex portions to the concave portions is suppressed, and therefore, the range over which liquid flows is restricted in both the convex portions and the concave portions. Therefore, a circumstance in which the flatness of the surface of the material layers is reduced due to flowing of the material is suppressed, and therefore, the modeling accuracy of the three-dimensional object is enhanced.

[2] In the three-dimensional modeling apparatus of the aspect, the first modeling process may be a process that forms the convex portions by laminating two or more of the material layers, and the second modeling process may be a process that respectively laminates one or more layers of a material layer on the convex portions and inside the concave portions in a state in which a clearance of a thickness equivalent to two layers of the material layers is maintained between the material layer of the convex portions and the material layer inside the concave portions.

According to the three-dimensional modeling apparatus of the aspect, it is possible to suitably spatially separate, in the lamination direction, the material layer laminated on the convex portions and the material layer formed inside the concave portions, and therefore, flowing of the material from the convex portions to the concave portions is further suppressed. Accordingly, a circumstance in which the flatness of the surface of the material layers is reduced is further suppressed.

[3] In the three-dimensional modeling apparatus of the aspect, the first modeling process may be a process that forms the convex portions so that the convex portions and the concave portions are alternately arranged in a first direction, which is perpendicular to the lamination direction, and a second direction, which is perpendicular to the lamination direction and the first direction.

According to the three-dimensional modeling apparatus of the aspect, since the convex portions and the concave portions are formed so as to be dispersed in a direction following the surface of the material layers to be formed, it is possible to enhance the smoothness of the surface of the material layer.

[4] In the three-dimensional modeling apparatus of the aspect, the modeling portion may form the material layer by removing at least a portion of a solvent included in the material. According to the three-dimensional modeling apparatus of the aspect, since the flowing range of the material before the solvent is removed is restricted, a reduction in the flatness of the surface of the material layer is suppressed.

[5] In the three-dimensional modeling apparatus of the aspect, the modeling portion may form the material layer by melting and curing a powder included in the material. According to the three-dimensional modeling apparatus of the aspect, since the flowing range of the material when the material is melted is restricted, a reduction in the flatness of the surface of the material layer is suppressed.

[6] According to a second aspect of the invention, there is provided a method for modeling a three-dimensional object by laminating material layers formed by a material having a fluid property, the method including forming concave portions, which are recessed in comparison with convex portions in a lamination direction in which the material layers are laminated, as a result of forming a plurality of convex portions that project in the lamination direction, laminating a material layer on the convex portions, and forming a material layer, which is spatially separated from the material layer laminated on the convex portions, inside the concave portions; and filling the concave portions with a material layer by disposing the material on the material layer inside the concave portions.

According to the three-dimensional modeling method, since a flowing range of the material is restricted in the respective formation regions of the convex portions and the concave portions, a circumstance in which the flatness of the surface of the material layer is reduced, which is caused by the fluid property of the material, is suppressed.

[7] According to a third aspect of the invention, there is provided a computer program for causing a three-dimensional modeling apparatus that models a three-dimensional object by laminating material layers formed by a material having a fluid property, to model the three-dimensional object, in which the computer program causes a computer included in the three-dimensional modeling apparatus to realize a function of forming concave portions, which are recessed in comparison with convex portions in a lamination direction in which the material layers are laminated, as a result of forming a plurality of convex portions that project in the lamination direction, a function of laminating a material layer on the convex portions, and forming a material layer, which is spatially separated from the material layer laminated on the convex portions, inside the concave portions, and a function of filling the concave portions with a material layer by disposing the material on the material layer inside the concave portions.

According to the computer program, it is possible to enhance the modeling accuracy of a three-dimensional object in a three-dimensional modeling apparatus.

Not all of the plurality of constituent elements in each of the above-mentioned aspects of the invention are essential, and a portion of the plurality of constituent elements may be altered, omitted, replaced with another new constituent element, or a portion of the limiting content thereof may be omitted as appropriate in order to solve a portion or all of the above-mentioned problems or in order to achieve a portion of or all of the effects disclosed in the present specification. In addition, a portion of or all of the technical features included in one of the above-mentioned aspects of the invention may be combined with a portion of or all of the technical features included in another of the above-mentioned aspects of the invention, or may be configured as an independent aspect of the invention in order to solve a portion or all of the above-mentioned problems or in order to achieve a portion of or all of the effects disclosed in the present specification.

The invention can be realized using various aspects other than a three-dimensional modeling apparatus, a three-dimensional modeling method, and a computer program. For example, the invention can be realized as a control method or a control device of a three-dimensional modeling apparatus, a manufacturing method of data for three-dimensional modeling and a computer program for manufacturing the data, or a non-transitory, tangible recording medium on which a computer program for three-dimensional modeling is recorded, or the like.

BRIEF DESCRIPTION OF THE DRAWINGS

The invention will be described with reference to the accompanying drawings, wherein like numbers reference like elements.

FIG. 6 is a second schematic view that schematically shows a material layer formed in Step 2.

DESCRIPTION OF EXEMPLARY EMBODIMENTS

A. First Embodiment

Figure 1:
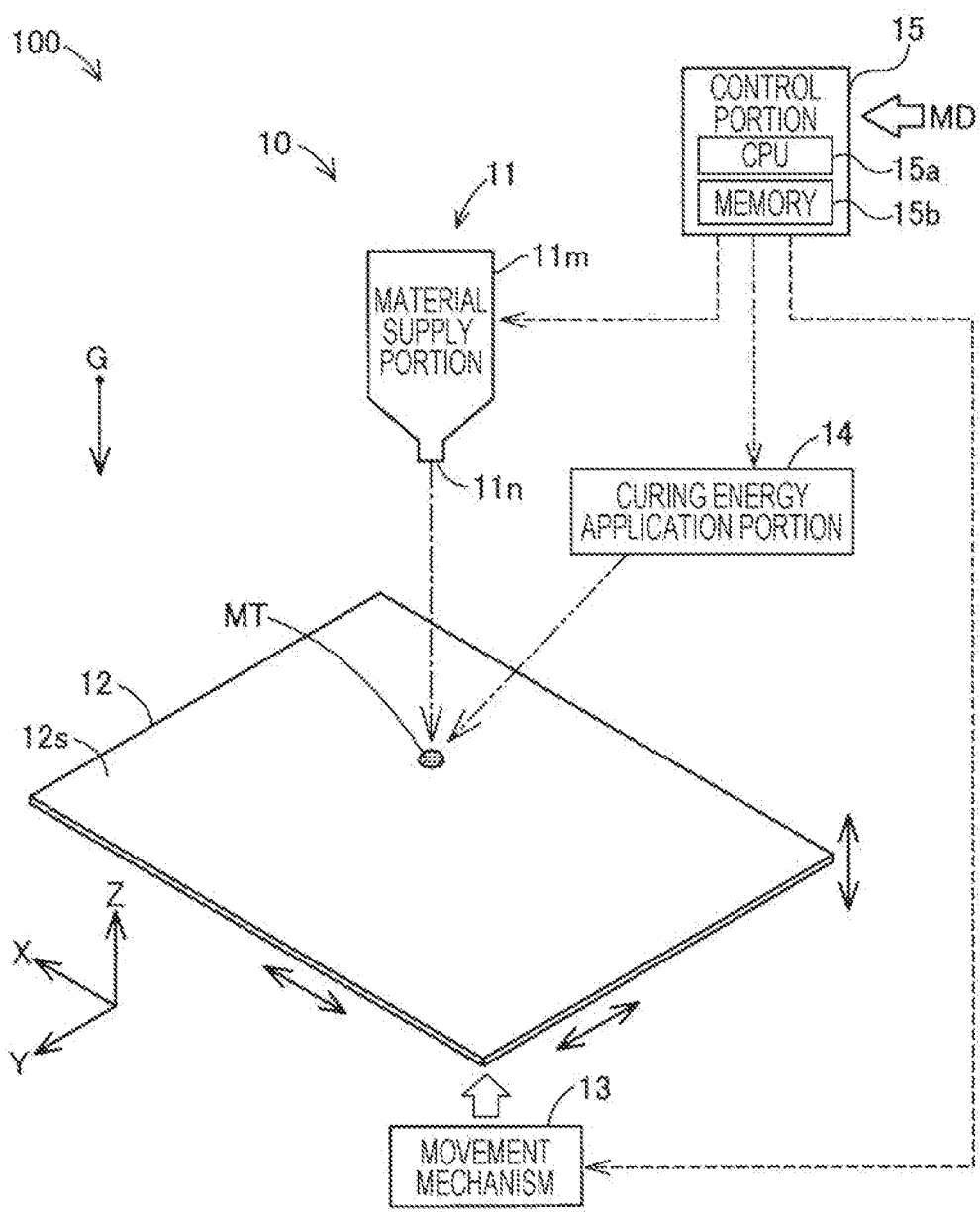
FIG. 1 is a schematic view that shows a configuration of a three-dimensional modeling apparatus in a first embodiment.

FIG. 1 is a schematic view that shows a configuration of a three-dimensional modeling apparatus 100 in a first embodiment. An arrow G, which shows a gravity direction (a vertical direction) when the three-dimensional modeling apparatus 100 is disposed in normal use state is shown in FIG. 1. The arrow G is illustrated as appropriate in each drawing referred to later.

The three-dimensional modeling apparatus 100 of the present embodiment models a three-dimensional object by sequentially stacking material layers by using a modeling portion 10. The material layers configure layers obtained by cutting a three-dimensional object, which is a modeling target, into a plurality of at minute intervals in a predetermined direction, and are formed by disposing and curing a material MT having a fluid property. In the present embodiment, each material layer is formed by arranging the material MT, which has a fluid property as a result of a solvent being included therein, in coordinates determined in advance in accordance with a modeling resolution. A specific example of the material MT will be mentioned later. The modeling portion 10 of the three-dimensional modeling apparatus 100 is provided with a material supply portion 11, a modeling stage 12, a movement mechanism 13, and a curing energy application portion 14.

The material supply portion 11 discharges and disposes a liquid droplet of the material MT, which has a fluid property, in a stipulated position on the modeling stage 12. The material supply portion 11 is provided with a main body portion 11*m* configured by a metal hollow container. A nozzle 11*n*, which is in communication with an interior space of the main body portion, is provided in the main body portion 11*m* of the material supply portion 11. The nozzle 11*n* is open toward the modeling stage 12. For example, the opening diameter of the nozzle 11*n* is approximately 5 to 300 μm. The material supply portion 11 discharges the material MT, which is delivered under pressure and supplied to the main body portion 11*m* from a material supply source (omitted from the drawings), from the nozzle 11*n* in a liquid droplet form as a result of a reciprocating motion of a piston provided in an inner portion of the main body portion 11*m*. In the present embodiment, the material supply portion 11 discharges a liquid droplet of the material MT toward the modeling stage 12, which is therebelow, from an upper side in the gravity direction. The material supply portion 11 discharges an amount of the material MT equivalent to one dot for each repetition of discharge. Additionally, the material supply portion 11 may discharge the material MT from the nozzle 11*n* by using a method other than reciprocating motion of a piston. For example, the material supply portion 11 may be configured as a component that discharges the material MT using pressure fluctuations inside a pressure chamber filled with the material MT when the inner wall surface of the pressure chamber is deformed by a piezoelectric element, or the like.

The modeling stage 12 is a base platform for modeling a three-dimensional object, which is a modeling target, and has a surface 12s on which the material layers are formed. In the present embodiment, the surface 12s is disposed in a flat manner. Arrows X, Y, and Z, which show directions that use the surface 12s of the modeling stage 12 as a reference point are shown in FIG. 1. The arrows X and Y are respectively two directions that are mutually orthogonal to one another and follow the surface 12s of the modeling stage 12. The directions of the arrows X and Y respectively coincide with the directions of coordinate system axes of coordinates at which the material supply portion 11 deposits a liquid droplet of the material MT on the surface 12s of the modeling stage 12. In the present embodiment, the arrows X and Y show directions parallel to a horizontal direction. The arrow Z shows a direction orthogonal to the surface 12s of the modeling stage 12. The direction of the arrow Z coincides with a lamination direction in which the material layers are laminated on the modeling stage 12. The lamination direction is a height direction of the three-dimensional object. In the present embodiment, the direction of the arrow Z coincides with the gravity direction.

The movement mechanism 13 relatively moves the modeling stage 12 relative to the nozzle 11n of the material supply portion 11. The movement mechanism 13 displaces the modeling stage 12 in the directions following the arrows X, Y, and Z. The movement mechanism 13 is provided with a motor that generates a driving force, and various actuators (respectively omitted from the drawings) such as a roller or a belt that moves the modeling stage 12 in the directions following the arrows X and Y, and a lift, or the like, that moves the modeling stage 12 in the direction following the arrow Z. In the present embodiment, a depositing position of a liquid droplet of the material MT on the surface 12s of the modeling stage 12 is controlled as a result of the modeling stage 12 moving relative to the material supply portion 11. Additionally, in the three-dimensional modeling apparatus 100, a configuration in which the modeling stage 12 is fixed and the material supply portion 11 is displaced relative to the modeling stage 12 due to the movement mechanism 13 may also be used.

The curing energy application portion 14 cures the material MT more than at a point of discharge by reducing the fluid property of the material MT as a result of removing at least a portion of a solvent included in the material MT by applying an energy to liquid droplets of the material MT deposited on the modeling stage 12. At this time, it is desirable that the curing energy application portion 14 at least cure the material MT to an extent at which the shape of the material layer can be retained. In the present embodiment, the curing energy application portion 14 is configured by a laser device, and applies light energy to the material MT as a result of radiating a laser. The curing energy application portion 14 includes at least a laser light source, a condensing lens for condensing a laser emitted from the laser light source onto the liquid droplets deposited on the modeling stage 12, and a galvanometer mirror for scanning the laser (respectively omitted from the drawings). The curing energy application portion 14 scans a depositing position of the material MT by using the laser, heats the material MT by using the light energy of the laser, and reduces the amount of a solvent included in the material MT. The curing energy application portion 14 applies the energy for curing the material MT each time the material supply portion 11 discharges a liquid droplet of the material MT, or for each material layer.

In addition to the above-mentioned modeling portion 10, the three-dimensional modeling apparatus 100 is provided with a control portion 15 that controls the modeling portion 10. The control portion 15 is configured by computer provided with a CPU 15a and a memory 15b. The CPU 15a exhibits various functions as a result of reading and executing computer programs in the memory 15b. The CPU 15a executes a computer program for causing the three-dimensional modeling apparatus 100 to model a three-dimensional object. The computer program causes the control portion 15 to realize a function of causing the modeling portion 10 to execute a modeling step of a flat site, which will be mentioned later. For example, the computer program may be recorded on various recording media such as a hard disk, a flash memory, a DVD-ROM, or the like.

The control portion 15 controls the material supply portion 11, the movement mechanism 13, and the curing energy application portion 14 in accordance with the above-mentioned computer program. The control portion 15 receives data MD for modeling a three-dimensional object from an external computer (omitted from the drawings) connected to the three-dimensional modeling apparatus 100. Data that represents disposition positions of the material MT for forming each material layer to be stacked in a height direction of the three-dimensional object is included in the data MD. In addition, in the present embodiment, the disposition positions of the material MT represented in the data MD are positions in which dots of the material MT are to be disposed as a result of discharge by the material supply portion 11.

The control portion 15 determines process conditions such as the timing at which the material supply portion 11 is caused to discharge a liquid droplet of the material MT, the depositing position of the liquid droplet on the modeling stage 12, the laser irradiation position and irradiation timing by the curing energy application portion 14, and the like, on the basis of the data MD. The control portion 15 may have a function of preparing data that represents a formation sequence of material layers in a modeling step, which will be mentioned later, from the data MD, which represents the three-dimensional object. The control portion 15 may acquire the data MD via a network of a recording medium instead of an external computer. The content of a modeling step executed under the control of the control portion 15 will be mentioned later.

Next, a specific example of the material MT used in the present embodiment will be described. In the present embodiment, the material MT is a paste form fluid composition that includes a powder material and a solvent. The material MT may include a powder material and a solvent. For example, an elementary powder of magnesium (Mg), iron (Fe), cobalt (Co), chromium (Cr), aluminum (Al), titanium (Ti), copper (Cu), nickel (Ni), an alloy powder (a maraging steel, stainless steel, a cobalt chromium molybdenum, a titanium alloy, a nickel alloy, an aluminum alloy, a cobalt alloy, or a cobalt chromium alloy) including one or more of the above-mentioned metals, or a mixed powder in which one or more selected from the above-mentioned elementary powders and alloy powders are combined may be used as the powder material. For example, the solvent of the material MT may be water, a (poly)alkylene glycol monoalkyl ether such as ethylene glycol monomethyl ether, ethylene glycol monoethyl ether, propylene glycol monomethyl ether, or propylene glycol monoethyl ether, an acetate ester such as ethyl acetate, n-propyl acetate, isopropyl acetate, n-butyl acetate, or isobutyl acetate, an aromatic hydrocarbon such as benzene, toluene, or xylene, a ketone such as methyl ethyl ketone, acetone, methyl isobutyl ketone, ethyl n-butyl ketone, diisopropyl ketone, or acetylacetone, and alcohol such as ethanol, propanol, or butanol, a tetraalkyl ammonium acetate, a sulfoxide solvent such as dimethyl sulfoxide or diethyl sulfoxide, a pyridine solvent such as pyridine, gammasymbol-picoline, or 2,6-lutidine, an ionic liquid such as tetraalkyl ammonium acetate (for example, tetrabutyl ammonium acetate), or a substance in which one or more of the above are combined.

The material MT may be a mixed material configured in a slurry form or a paste form by mixing a binder with the powder material and the solvent. For example, the binder may be an acrylic resin, an epoxy resin, a silicone resin, a cellulose resin, or another synthetic resin, a PLA (polylactic acid), a PA (polyamide), a PPS (polyphenylene sulfide), or another thermoplastic resin. The material MT is not limited to a substance that includes the above-mentioned powder material, and for example, may be a substance in which a resin such as a general-purpose engineering plastic, such as a polyamide, a polyacetal, a polycarbonate, a modified polyphenylene ether, a polybutylene terephthalate, or a polyethylene terephthalate, is melted. In addition, the material MT may be a resin such as an engineering plastic, such as a polysulfone, a polyethersulfone, a polyphenylene sulfide, a polyarylate, polyimide, a polyamide-imide, a polyetherimide, or a polyether ether ketone. In this manner, it is possible to adopt a metal other than the above-mentioned metals, a ceramic, a resin, or the like, as the material MT. A sintering aid may be included in the material MT.

Figure 2:
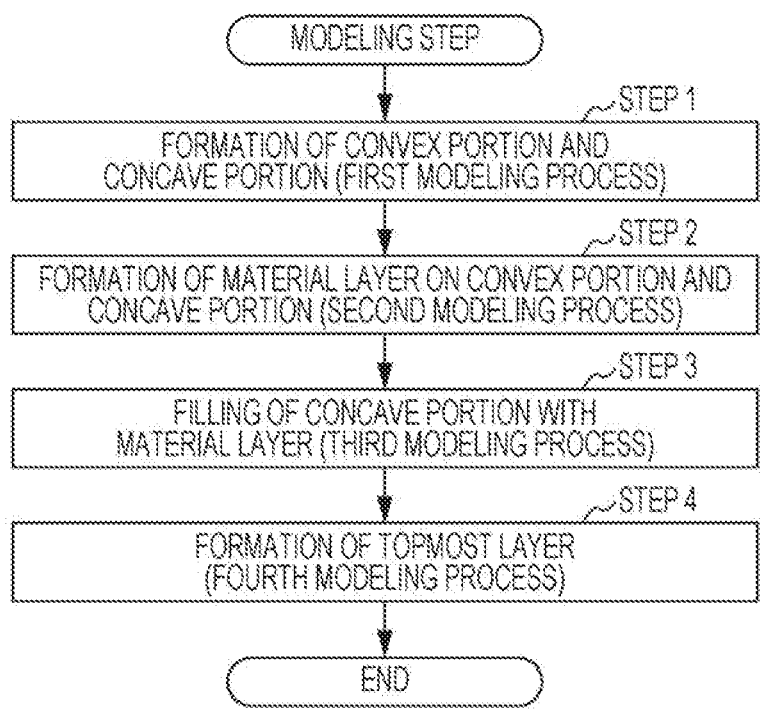
FIG. 2 is a flowchart that shows a sequence of a modeling step executed in the three-dimensional modeling apparatus.

An example of a modeling step executed in the three-dimensional modeling apparatus 100 will be described with reference to FIGS. 2 to 9. FIG. 2 is a flowchart that shows a sequence of a modeling step executed in the three-dimensional modeling apparatus 100. FIGS. 3 to 9 are schematic views that schematically show an example of a material layer ML laminated on the modeling stage 12 in each step of FIG. 2. The material layer ML on the modeling stage 12 when viewed in the direction of the arrow Z is shown in the upper sections of FIGS. 3 to 9. In addition, schematic cross-sections of the material layer ML taken along a line A-A shown in the respective upper sections are shown in the lower sections of FIGS. 3 to 9.

In the upper sections of FIGS. 3 to 9, for the sake of convenience, coordinates on the surface 12s of the modeling stage 12 are shown by using broken lines that partition in a lattice form. The control portion 15 forms a dot of the material MT by causing the material supply portion 11 to discharge a liquid droplet of the material MT inside each grid defined by the broken lines. Hereinafter, a material layer of a dot unit that configures a portion of the material layer ML and is formed by a single dot of the material MT will be referred to as a "material layer MLs". In FIGS. 3 to 9, for the sake of convenience, the hatching of the material layers MLs is varied for each step in which formation is carried out. In addition, in FIGS. 3 to 9, for the sake of convenience, the material layers MLs are shown by using a cube shape. In practice, in a case of not being coupled to another material layer MLs, a single material layer MLs has a substantially circular outer peripheral outline when viewed in the direction of the arrow Z, and has a shape that in which a substantially semi-circular shape is compressed in the lamination direction when viewed in the directions of the arrows X and Y.

The three-dimensional modeling apparatus 100 of the present embodiment executes at least the modeling step described below when forming a flat site that includes a three-dimensional object. The term "flat site" refers to a site at which a number of layers, which is determined in advance, or more of a flat material layer ML is laminated. The term "flat material layer ML" refers to a material layer ML in which a number, which is determined in advance, or more of material layers MLs are continuously arranged respectively in the directions of the arrows X and Y without allowing spaces between dots. In the present embodiment, a site at which 4 or more layers of a flat material layer ML, in which two or more material layers MLs are arranged respectively in the directions of the arrows X and Y, are laminated is defined as a flat site. The surface of a flat site need not necessarily configure the surface of a three-dimensional object, which is a modeling target. A flat site may be a site in which a portion of or all of the site is embedded inside the three-dimensional object. Hereinafter, a modeling step of a flat site that has a substantially rectangular parallelepiped shape will be described as a specific example in order to facilitate understanding.

Figure 3:
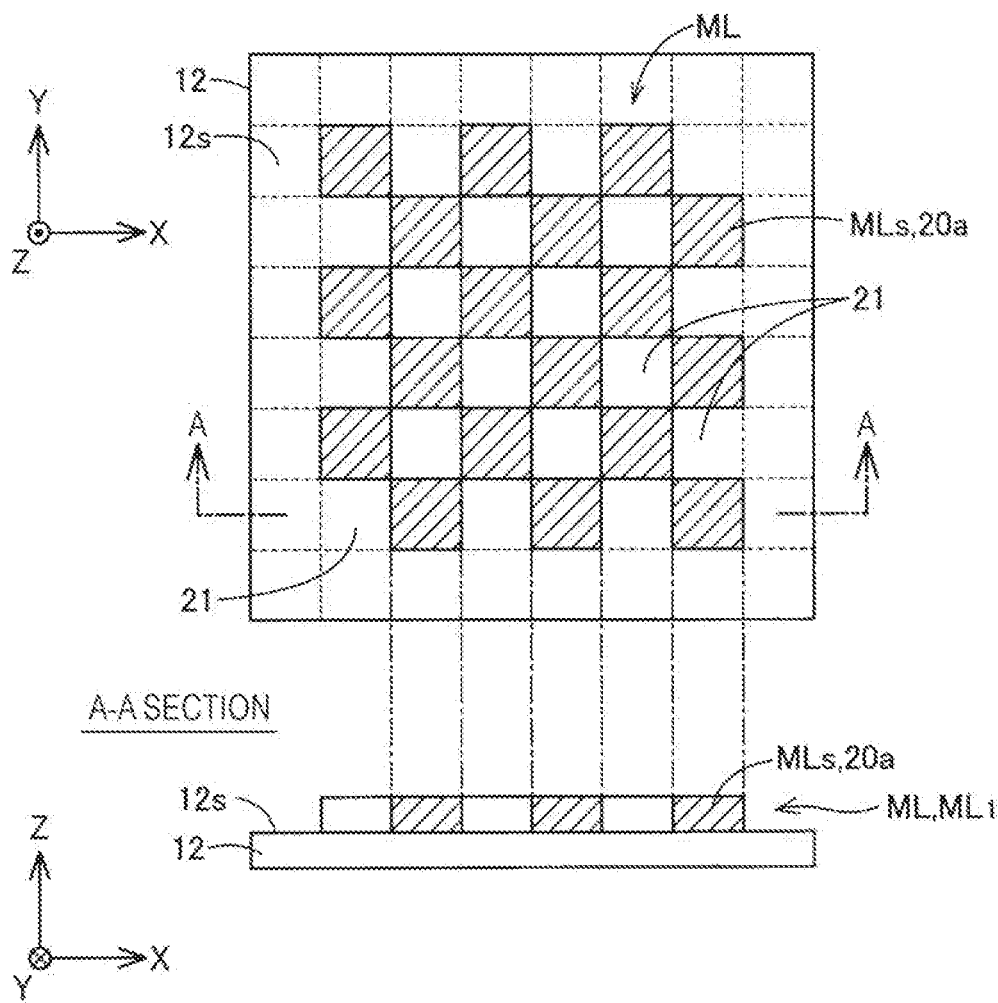
FIG. 3 is a first schematic view that schematically shows a material layer formed in Step 1.
Figure 4:
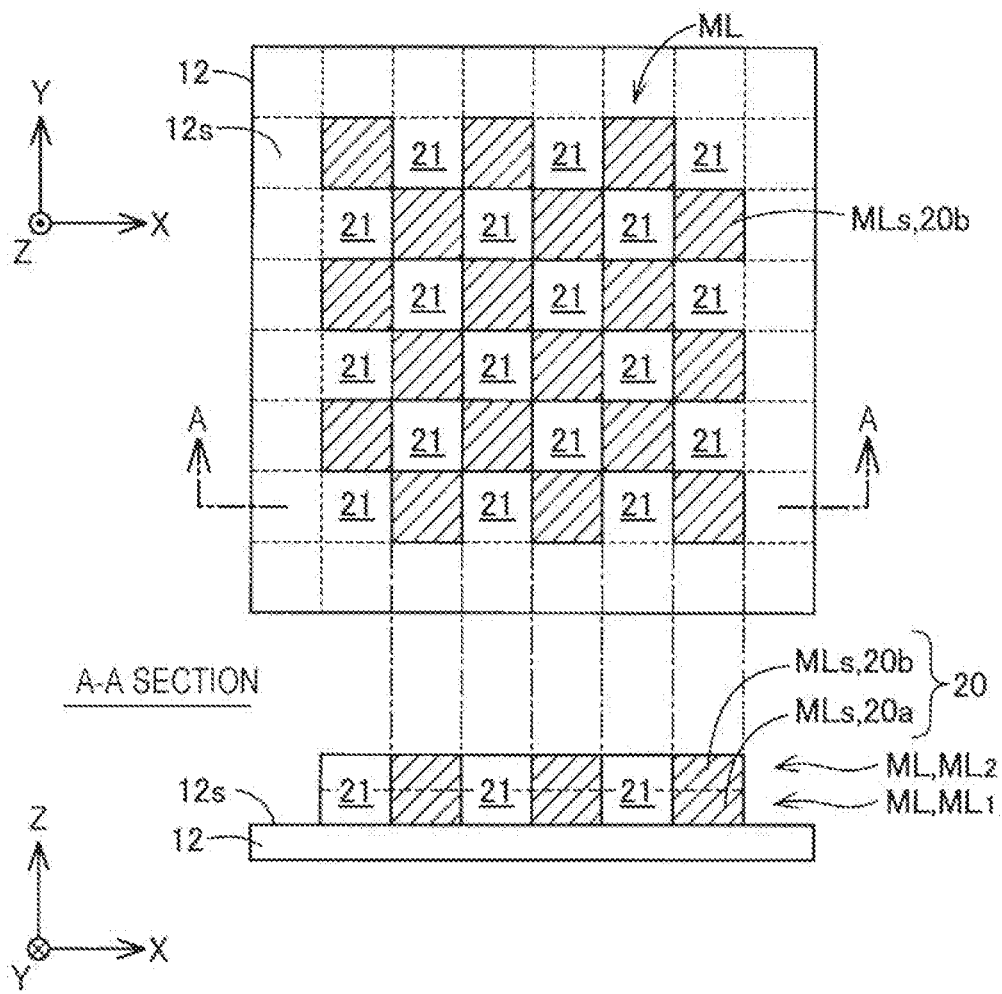
FIG. 4 is a second schematic view that schematically shows a material layer formed in Step 1.

In Step 1, the control portion 15 executes a first modeling process that forms a plurality of convex portions 20, which project in the lamination direction, on the modeling stage 12 by curing material MT discharged from the material supply portion 11 (FIGS. 3 and 4). Each convex portion 20 should have an apex at a different coordinate, and a portion thereof may be coupled with another convex portion 20 at a lower end portion, or the like, thereof. It is desirable that each convex portion 20 be formed by laminating two or more material layers MLs. The reason for this will be mentioned later. In the present embodiment, each convex portion 20 is formed by laminating two material layers MLs (FIG. 4).

The control portion 15 forms a plurality of the material layers MLs that configure a first layer 20a, which is a base end portion of each convex portion 20 (FIG. 3). The material layers MLs that configure the first layer 20a configure a portion of a first material layer $ML_1$, which is a lowermost layer of the flat site. In the present embodiment, the material layers MLs that configure the first layer 20a are arranged so that regions in which the material layers MLs are formed and regions in which the material layers MLs are not formed respectively occur in an alternate manner in the direction of the arrow X (a first direction) and the direction of the arrow Y (a second direction). More specifically, the material layers MLs that configure the first layer 20a are respectively arranged at an interval of one dot in the direction of the arrow X and the direction of the arrow Y.

Next, the control portion 15 forms material layers MLs, which configure a second layer 20b that is an upper end portion of the convex portions 20, on each first layer 20a (FIG. 4). The material layers MLs that configure the second layer 20b configure a portion of a second material layer $ML_2$ of the flat site.

In the first modeling process of Step 1, a plurality of concave portions 21, which are recessed in the lamination direction, are formed on the modeling stage 12 as a result of forming the convex portions 20 (FIG. 4). Each concave portion 21 is adjacent to two or more convex portions 20, and is a site that is recessed in the lamination direction in comparison with the convex portions 20. Each concave portion 21 is configured by a region that faces two convex portions 20 formed in positions that face one another. A region interposed between two convex portions 20, and a region that respectively faces two convex portions 20 arranged in an adjacent manner and is positioned between the two convex portions 20 in the arrangement direction thereof is included in the above-mentioned region. For example, in FIG. 4, a region interposed between two convex portions 20 in at least one direction of an X direction and a Y direction, and a region in which at least one adjacent convex portion 20 is present in the X direction and the Y direction are included. In the present embodiment, the first modeling process can be interpreted as a process in which the convex portions 20 are formed in a manner in which the convex portions 20 and the concave portions 21 are respectively arranged in the first direction, which is perpendicular to the lamination direction, and the second direction, which is perpendicular to the lamination direction and the first direction.

Figure 5:
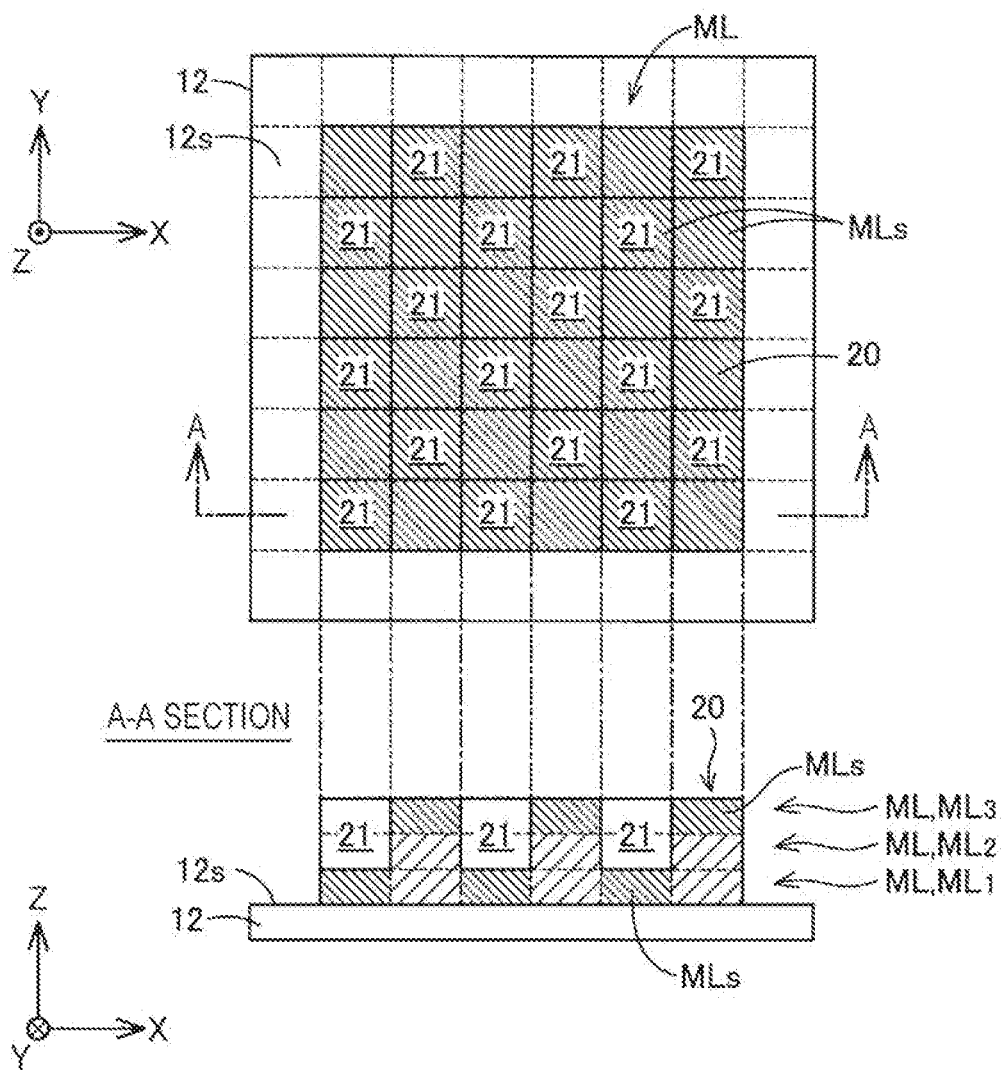
FIG. 5 is a first schematic view that schematically shows a material layer formed in Step 2.

In Step 2, the control portion 15 executes a second modeling process that laminates material layers MLs on each convex portion 20 and forms material layers MLs inside each concave portion 21 (FIG. 5). In the second modeling process, material layers MLs formed inside each concave portion 21 are formed so as to be spatially separated in the lamination direction from the material layers MLs laminated on each convex portion 20, and are not directly coupled with the material layers MLs laminated on each convex portion 20. The material layers MLs formed inside each concave portion are formed so as to come into contact with a material layer MLs that configures an adjacent convex portion 20 below a material layer MLs laminated on the convex portion 20.

In the present embodiment, in a first lamination step of the material layers MLs in the second modeling process, material layers MLs that configure a third material layer $ML_3$ of the flat site are formed on each convex portion 20, and material layer MLs that configure the first material layer $ML_1$ of the flat site are formed inside each concave portion 21. As a result of this lamination step, a material layer $ML_1$ of the first layer of the flat site is completed.

In the second modeling process of Step 2, after the above-mentioned first lamination step of the material layers MLs, a lamination step that laminates material layers MLs on the material layers MLs of each convex portion 20 and on the material layers MLs inside each concave portion 21 is represented (FIG. 6). Lamination steps of the material layers MLs from the second lamination step and onwards in the second modeling process are repeated until the material layer MLs of each convex portion 20 reaches the height of an n–1$^{th}$ layer. n is a nonnegative integer, and is the number of layers of the material layers MLs that configure the flat site. In a case in which the flat site is configured by four layers of the material layers MLs, lamination steps of the second lamination step and onwards in the second modeling process are omitted.

The second modeling process is a process that respectively laminates one or more layers of the material layers MLs on the convex portions 20 and inside the concave portions 21 in a state in which a clearance of a thickness equivalent to two layers of the material layers MLs is maintained between a topmost material layer MLs of the convex portions 20 and a topmost material layers MLs inside the concave portions 21. In the second modeling process of the present embodiment, the lamination step of the material layers MLs is repeated in a state in which a thickness equivalent to two layers of the material layers MLs is maintained as a clearance.

In the present embodiment, as a result of the second modeling process of Step 2, material layers MLs that configure portions of material layers $ML_{n-1}$ and $ML_{n-2}$ of an n–1$^{th}$ layer and an n–2$^{th}$ layer of the flat site are formed on the convex portions 20. In addition, material layers MLs of an n–3$^{th}$ layer are laminated inside the concave portions 21, and a material layer $ML_{n-3}$ of an n–3$^{th}$ layer of the flat site is completed.

Figure 7:
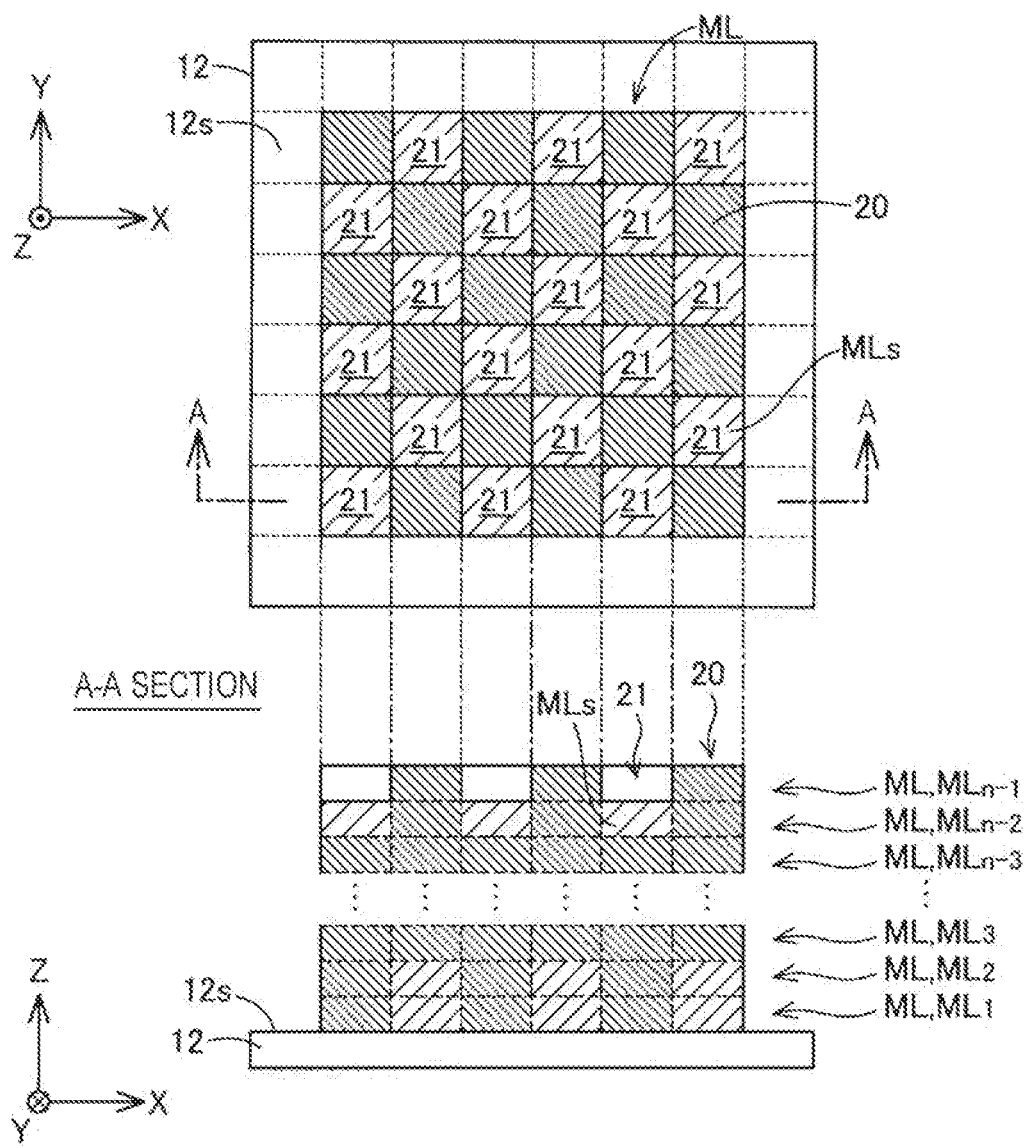
FIG. 7 is a first schematic view that schematically shows a material layer formed in Step 3.
Figure 8:
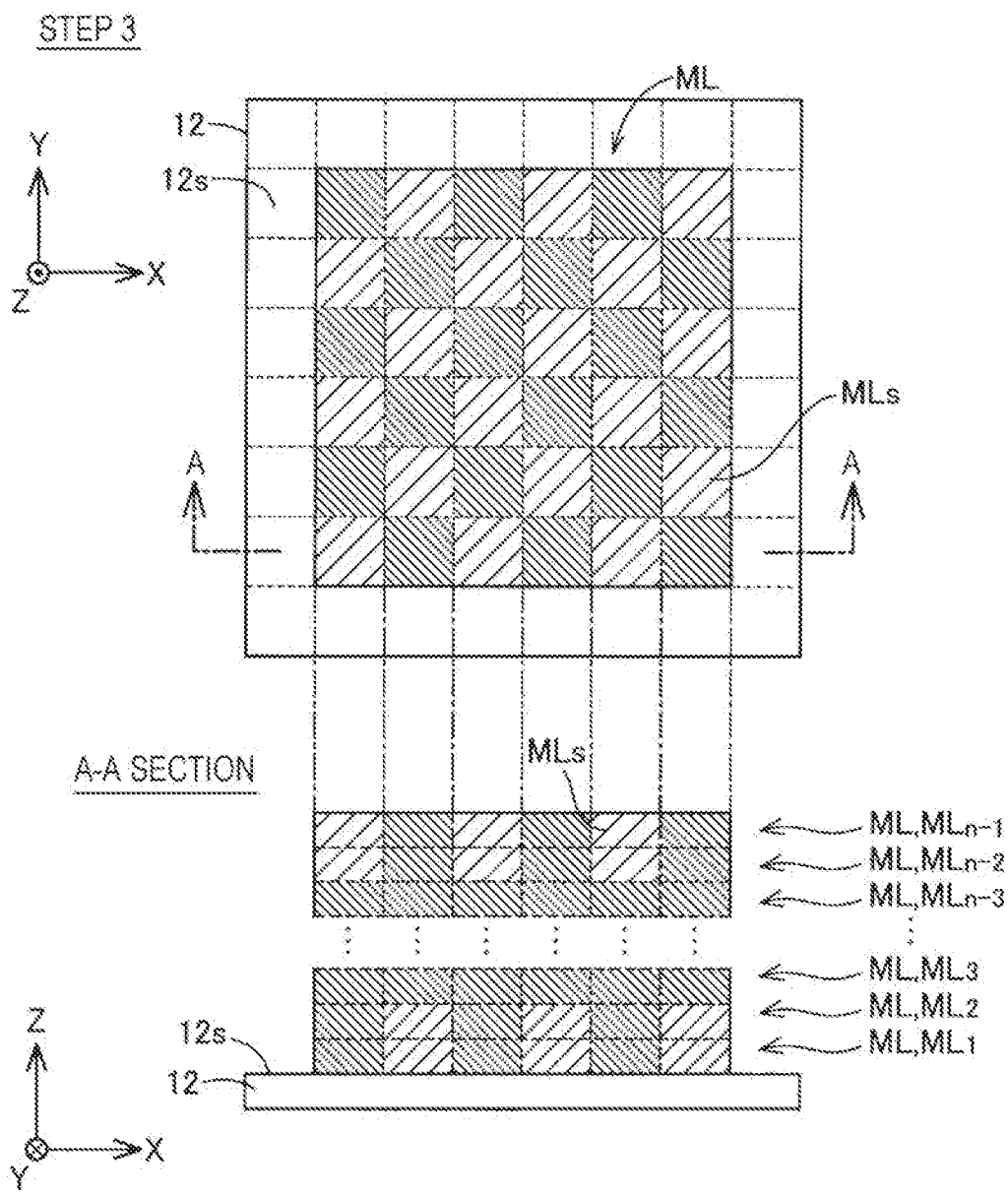
FIG. 8 is a second schematic view that schematically shows a material layer formed in Step 3.

In Step 3, the control portion 15 executes a third modeling process that fills the concave portions 21 by disposing and curing the material MT on the material layers MLs inside the concave portion 21 (FIG. 7). In the present embodiment, a plurality of the material layers MLs are laminated inside the concave portions 21 up to the same height position as the topmost material layers MLs of the convex portions 20, and the surface of the material layer $ML_{n-1}$ of the n–1$^{th}$ layer is made flat (FIG. 8). More specifically, two layers of material layers MLs, which configure portions of the material layers $ML_{n-1}$ and $ML_{n-2}$ of the n–1$^{th}$ layer and the n–2$^{th}$ layer the material layer of the flat site, are laminated inside the concave portions 21. As a result of this, the material layer $ML_{n-1}$ of the n–1$^{th}$ layer of the flat site is completed.

Figure 9:
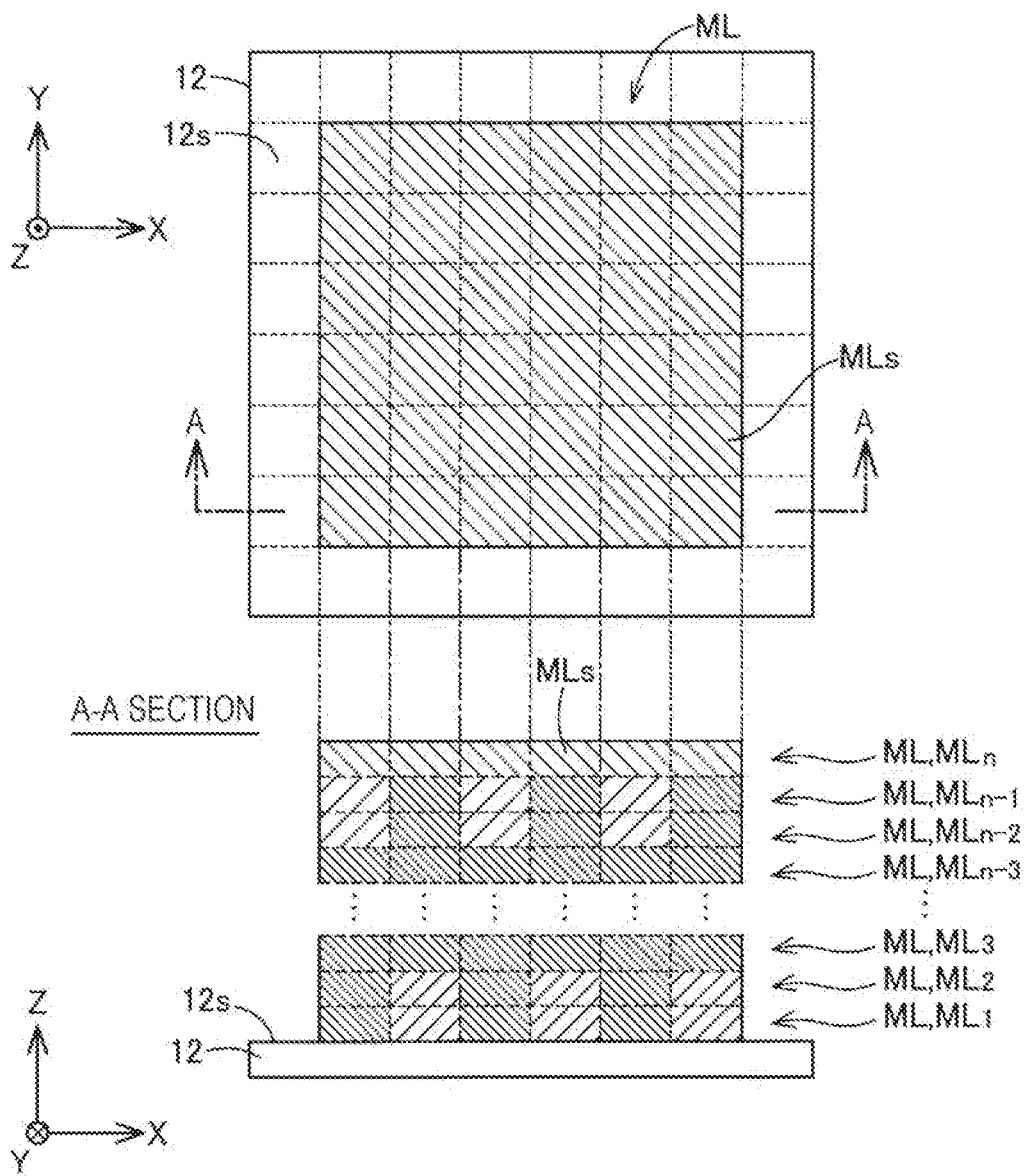
FIG. 9 is a schematic view that schematically shows a material layer formed in Step 4.

In Step 4, the control portion 15 executes a fourth modeling process that forms a material layer $ML_n$ of an n$^{th}$ layer, which is the topmost layer of the flat site (FIG. 9). In Step 4, a flat material layer $ML_n$ is formed by forming material layers MLs so as to cover the entirety of the modeling stage 12 within a formation region of the flat site. As a result of the above-mentioned steps, the modeling step of a flat site is completed. Additionally, the fourth modeling process of Step 4 may be omitted. However, as a result of executing the fourth modeling process, the flatness and the smoothness of the flat site are enhanced. After Step 4, the three-dimensional object modeled on the modeling stage 12 may be sintered by a heating furnace or a heater.

In the above-mentioned manner, in the three-dimensional modeling apparatus 100 of the present embodiment, when forming a flat site, the convex portions 20 and the concave portions 21 are formed in the first modeling process and material layers MLs are formed on the convex portions 20 and inside the concave portions 21 in the second modeling process. In the second modeling process, material layers MLs formed on the convex portions 20 and material layers MLs formed inside the concave portions 21 are formed in a manner of not being directly coupled, and the material MT disposed on the convex portions 20 does not come into contact with the material MT disposed inside the concave portions 21. As a result of this, flowing of the material MT disposed inside the concave portions 21 is suppressed by the convex portions 20, and a circumstance in which the material MT disposed on the convex portions 20 flows into the concave portions 21 is suppressed. Accordingly, it is possible to finely disperse a disposition region of the material MT, which has a fluid property, and therefore, a circumstance in which materials MT equivalent to one dot, which have a fluid property, join together, and the materials MT spread as a result of flowing over a wide range is suppressed. Therefore, the occurrence of unevenness in the drying rate within the disposition region of the material MT is suppressed, and therefore, a circumstance in which the flatness of the surface of each material layer ML is reduced, which is caused by a difference in the drying time for sites having uneven drying rates, is suppressed. In addition, a circumstance in which the flatness of the upper surface of the flat site is reduced is suppressed by a curve of the surface of the material layer ML due to surface tension of the material MT.

In the second modeling process of the present embodiment, material layers MLs are laminated on the convex portions 20 and inside the concave portions 21 after configuring the convex portions 20 by using two or more layers of material layers MLs. Accordingly, a clearance between the material MT disposed in a region on the convex portions and the material MT disposed in a region inside the concave portions 21 is ensured, and therefore, flowing of the material MT from on the convex portions 20 to inside the concave portions 21 is further suppressed. Accordingly, collapsing of the shape of the material layer ML in each region is suppressed, and therefore, it is possible to further suppress a reduction in the dimensional accuracy of the flat site.

In the first modeling process of the present embodiment, the convex portions 20 are formed so that the convex portions 20 and the concave portions 21 are respectively arranged in an alternate manner in the directions of the arrows X and Y. As a result of this, since a formation region of the material layers MLs are more finely dispersed, it is possible to further suppress a reduction in the dimensional accuracy of the flat site. In particular, in the present embodiment, since the convex portions 20 and the concave portions 21 are alternately arranged in one dot units, it is possible to further enhance the flatness of the upper surface of each material layer ML.

In addition, in the present embodiment, in the fourth modeling process, the material layer $ML_n$ of the $n^{th}$ layer, which is formed by disposing the material MT without allowing spaces between dots, is formed on the material layer $ML_{n-1}$ of the $n-1^{th}$ layer, in which flatness is enhanced. As a result of this, in the above-mentioned manner, it is possible to model the upper surface of the flat site more finely.

The shape of the flat site modeled by the three-dimensional modeling apparatus 100 of the present embodiment is not limited to the substantially rectangular parallelepiped shape described as a specific example. The flat site need not necessarily be a site in which a cross-sectional shape at a cutting surface perpendicular to the lamination direction is substantially rectangular, and may be an arbitrary shape such as a substantially circular shape, or a polygonal shape. In addition, the three-dimensional modeling apparatus 100 of the present embodiment may execute another modeling process that models a location having a shape that differs from the flat site in place of the above-mentioned modeling process of the flat site.

B. Second Embodiment

Figure 10:
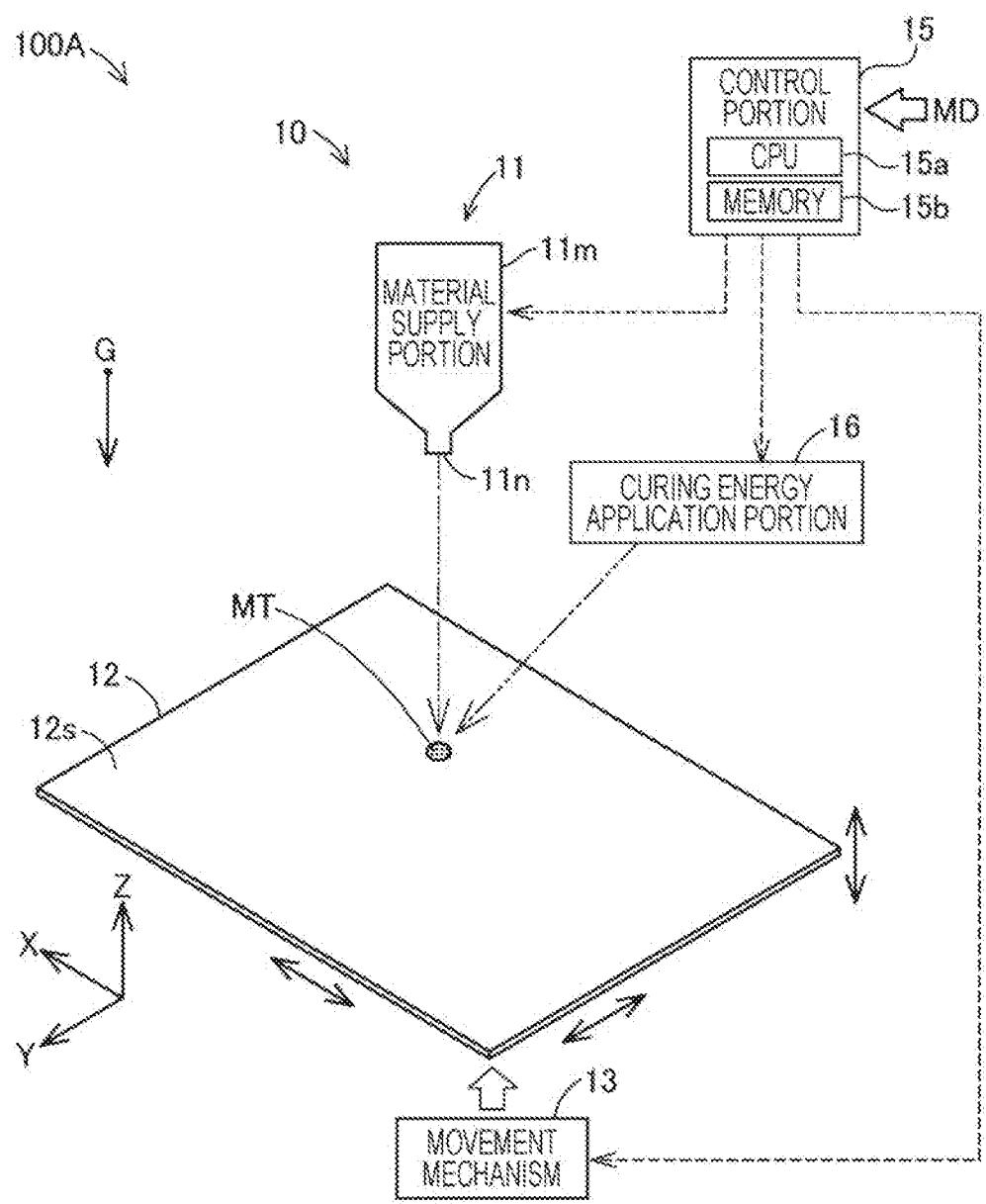
FIG. 10 is a schematic view that shows a configuration of a three-dimensional modeling apparatus in a second embodiment.

FIG. 10 is a schematic view that shows a configuration of a three-dimensional modeling apparatus 100A in a second embodiment. Other than being provided with a melting energy application portion 16 in place of the curing energy application portion 14, the three-dimensional modeling apparatus 100A of the second embodiment has substantially the same configuration as the three-dimensional modeling apparatus 100 of the first embodiment.

The melting energy application portion 16 heats the material MT that the material supply portion 11 disposes on the modeling stage 12 to a temperature of the melting point or more of a powder material in the material MT as a result of laser irradiation. The powder material of the material MT, which is irradiated with a laser by the melting energy application portion 16, melts and then cures after attaining a state of having a fluid property.

In this manner, the three-dimensional modeling apparatus 100A forms the material layer ML by curing as a result of temporarily melting the powder material included in the material MT and bonding particles thereof. Additionally, in the three-dimensional modeling apparatus 100A, the material supply portion 11 may be configured as a component that disposes a dried powder material in a coordinate position stipulated by the control portion 15 in place of discharging the paste form material MT including the powder material and the solvent. For example, the material supply portion 11 may dispose the powder material in a stipulated coordinate position in a state of being wrapped in a removable capsule. In the three-dimensional modeling apparatus 100A, the material MT is set to a state of having a melted fluid property by the melting energy application portion 16. The three-dimensional modeling apparatus 100A can be interpreted as forming the material layer ML by using a material MT that has a fluid property when modeling a three-dimensional object.

The three-dimensional modeling apparatus 100A executes a similar modeling process to that described in the first embodiment when modeling a flat site (FIG. 2). As a result of this, in a similar manner to that described in the first embodiment, the modeling accuracy of a flat site is enhanced. However, in the three-dimensional modeling apparatus 100A of the second embodiment, it is preferable that the convex portions 20, which are formed in the first modeling process, be formed by three or more layer of the material layers MLs. The reason for this is that, in a case in which the material layers MLs are formed by melting the material MT, there is a possibility that, as a result of the melting, the height (the thickness) of the material layers MLs will be less than a case of the three-dimensional modeling apparatus 100 of the first embodiment.

In the above-mentioned manner, in the three-dimensional modeling apparatus 100A of the second embodiment, in the same manner as the three-dimensional modeling apparatus 100 of the first embodiment, it is also possible to suppress a circumstance in which the dimensional accuracy of a three-dimensional object is reduced due to flowing of the material, and therefore, it is possible to enhance the modeling accuracy of the three-dimensional object. In addition, according to the three-dimensional modeling apparatus 100A of the second embodiment, it is possible to exhibit various functional effects similar to those described in the first embodiment.

C. Modification Examples

C1. Modification Example 1

In each of the above-mentioned embodiments, the material supply portion 11 discharges and disposes the material MT on the surface 12s of the modeling stage 12 in one dot units. In contrast to this, the material supply portion 11 need not necessarily dispose the material MT on the surface 12s of the modeling stage 12 in one dot units, and may dispose the material MT on the surface 12s of the modeling stage 12 by using a method other than discharge. For example, the material supply portion 11 may dispose the material MT on the surface 12s of the modeling stage 12 for each pattern of the material layer ML by using a method such as screen printing. The material supply portion 11 may dispose the material MT on the surface 12s of the modeling stage 12 as a result of transfer one dot at a time or for each material layer ML.

C2. Modification Example 2

In the first embodiment mentioned above, the modeling portion 10 cures by removing at least a portion of the solvent included in the material MT due to irradiation with a laser from the curing energy application portion 14, and reduces the fluid property of the material MT. In the second embodiment mentioned above, the modeling portion 10 cures by melting the powder material included in the material MT due to irradiation with a laser from the melting energy application portion 16. In contrast to this, the modeling portion 10 may remove the solvent of the material MT, and may melt the powder material included in the material MT by using methods other than irradiation with a laser. For example, the modeling portion 10 may heat the material MT by using a heater, or the like. For example, the modeling portion 10 may melt the material MT by using a melting agent. In addition, the modeling portion 10 may cure by heating and sintering the material MT, which has a fluid property. The modeling portion 10 may also cure the material MT by using another method. For example, the modeling portion 10 may cure the material MT by applying a curing agent. A photo-curable resin may also be used as the material MT, and the modeling portion 10 may also cure the material MT by photocuring.

C3. Modification Example 3

In each of the above-mentioned embodiments, the convex portions 20 are formed so that the convex portions 20 and the concave portions 21 are respectively arranged in an alternate manner in the direction of the arrow X and the direction of the arrow Y in the first modeling process of Step 1 (FIG. 3 and FIG. 4). In contrast to this, in the first modeling process of Step 1, for example, the convex portions 20 may be formed so that the convex portions 20 and the concave portions 21 are arranged in an alternate manner in the direction of either the arrow X or the arrow Y.

C4. Modification Example 4

In each of the above-mentioned embodiments, the plurality of the convex portions 20 are formed so as to be disposed in a zigzag manner with an interval of one dot in the first modeling process of Step 1 (FIG. 3 and FIG. 4). In contrast to this, the plurality of the convex portions 20 may be arranged at intervals of one dot or more, or may be arranged in a lattice form instead of being arranged in a zigzag manner. The plurality of the convex portions 20 may be formed in a random manner.

C5. Modification Example 5

In each of the above-mentioned embodiments, each of the convex portions 20 is formed by laminating two or more layers of the material layers MLs in the first modeling process of Step 1 (FIG. 3 and FIG. 4). In contrast to this, each of the convex portions 20 may be formed by a single layer of the material layer MLs without laminating a plurality of the material layers MLs. In this case, the material layers MLs that configure the convex portions 20 may be formed so as to be higher than the material layers MLs of other locations.

C6. Modification Example 6

In each of the above-mentioned embodiments, the convex portions 20 are formed on a flat surface 12s of the modeling stage 12 in the first modeling process of Step 1 (FIG. 3 and FIG. 4). In contrast to this, the convex portions 20 may be overlapped and formed on a protruding structure provided in advance on the modeling stage 12.

C7. Modification Example 7

In the first modeling process (FIG. 3 and FIG. 4) of each of the above-mentioned embodiments, when the convex portions 20 are formed, the amount of the material MT when forming a section of an upper layer may be reduced in comparison with when forming a section of a lower layer of the convex portions 20. As a result of this, it is possible to form the convex portions 20 in a manner that is piled up high. In the configuration of each of the above-mentioned embodiments, the thickness of each material layers MLs may be varied for each lamination position and disposition location.

C8. Modification Example 8

The material MT of each of the above-mentioned embodiments is not limited to the material illustrated by way of example in the first embodiment. The material MT may be any kind of material that has a property of curing from a state of having a fluid property. For example, a powder form resin material may be used as the material MT, and may be cured by melting the resin material.

C9. Modification Example 9

In each of the above-mentioned embodiments, a portion of or all of the functions and processes realized by software may be realized by hardware. In addition, a portion of or all of the functions and processes realized by hardware may be realized by software. For example, various circuits such as an integrated circuit, a discrete circuit, or a circuit module in which such circuits are combined can be used as hardware.

The invention is not limited to the above-mentioned embodiments, examples, and modification examples, and it is possible to realize various configurations within a range that does not depart from the gist thereof. For example, the technical features of the embodiments, examples, and modification examples that correspond to technical features of each aspect set forth in the summary columns of the invention may be replaced or combined as appropriate in order to solve a portion of or all of the above-mentioned problems, or in order to achieve a portion of or all of the above-mentioned effects. In addition, with the exception of technical features described as essential features in the present specification, it is possible to remove technical features of the invention as appropriate.

The entire disclosure of Japanese Patent Application No. 2016-180637, filed Sep. 15, 2016 is expressly incorporated by reference herein.

What is claimed is:

1. A three-dimensional modeling apparatus comprising:
   a modeling member that models a three-dimensional object by laminating layers formed by disposing a fluid material;
   a memory configured to store a computer program; and
   a processor configured to execute the computer program so as to:
   perform a first modeling process in which a plurality of convex portions are formed by laminating two or more of the layers, the plurality of convex portions projecting in a lamination direction in which the layers are laminated, areas between adjacent two of the plurality of convex portions defining concave portions, the concave portions being recessed in comparison with the plurality of convex portions along the lamination direction;
   perform a second modeling process in which one or more of the layers is laminated on the plurality of convex portions and in an inside of the concave portions such that a clearance equivalent to at least two layers of the layers is maintained between a top surface of the plurality of convex portions and a top surface of the concave portions; and perform a third modeling process in which the concave portions is filled with at least two of the layers by disposing the fluid material on the layer inside the concave portions, wherein a flat surface included in the three-dimensional object is formed by the layers of the plurality of convex portions and the layers of the concave portions after the processor performs the first, second, and third modeling processes, the flat surface is embedded inside the three-dimensional object, and the flat surface corresponds to an area where the top layers of the plurality of convex portions and the concave portions are continuously alternately arranged without spaces therebetween and where there are at least four of the laminated layers in the lamination direction.

2. The three-dimensional modeling apparatus according to claim 1, wherein in the first modeling process, the convex portions and the concave portions are alternately arranged in a first direction and a second direction perpendicular to each other, and the first and second directions are perpendicular to the lamination direction.

3. The three-dimensional modeling apparatus according to claim 1, wherein the processor is configured to control the modeling member to form the layer by removing at least a portion of a solvent included in the fluid material.

4. The three-dimensional modeling apparatus according to claim 1, wherein the processor is configured to control the modeling member to form the layer by curing after melting a powder included in the fluid material.

* * * * *